(12) United States Patent
Lee

(10) Patent No.: US 7,371,119 B1
(45) Date of Patent: May 13, 2008

(54) CARD ADAPTER STRUCTURE

(76) Inventor: Yun-Hsiu Lee, 15F, No. 88, Hsing-De Rd., San Chung, Taipei Hsien (TW)

( * ) Notice: Subject to any disclaimer, the term of this patent is extended or adjusted under 35 U.S.C. 154(b) by 0 days.

(21) Appl. No.: 11/650,535

(22) Filed: Jan. 8, 2007

(51) Int. Cl.
*H01R 24/00* (2006.01)
(52) U.S. Cl. ....................... 439/630; 439/946; 439/945
(58) Field of Classification Search ................ 439/638, 439/630, 945, 946
See application file for complete search history.

(56) References Cited

U.S. PATENT DOCUMENTS

| | | | |
|---|---|---|---|
| 7,052,295 B1 * | 5/2006 | Lin | 439/630 |
| 7,210,967 B1 * | 5/2007 | Lee | 439/630 |
| 2006/0166559 A1 * | 7/2006 | Nakai et al. | 439/630 |

* cited by examiner

*Primary Examiner*—Briggitte R. Hammond
(74) *Attorney, Agent, or Firm*—Troxell Law Office, PLLC

(57) ABSTRACT

The present invention provides an improved card adapter structure which includes an upper cover, a lower cover and a converter terminal set. The upper cover is designed to conform to short memory card specifications, wherein an insertion slot is defined at the rear of the upper cover corresponding to the shape of a micro memory card. A port is configured in a central portion of the lower cover to accommodate a micro memory card. The converter terminal set is configured with eleven terminals, wherein an injection molded fixing mount fixedly covers each pin of the converter terminal set, and eleven pins extend outward towards a short memory card opening. Pin three and pin six are jointly configured with a large grounding area, and eight pins extend outward towards the micro memory card port. Accordingly, the adapter structure conveniently converts a micro memory card into a short memory card.

7 Claims, 7 Drawing Sheets

CARD ADAPTER STRUCTURE

BACKGROUND OF THE INVENTION (a) Field of the Invention

The present invention relates to an improved card adapter structure that is provided with effectiveness of reinforced grounding, protecting data stored within memory, preventing noise interference, increasing memory card data access—frequency and facilitating design of card adapter circuit and structure, and which is applicable for use in various types of card adapter structures or similar structures.

(b) Description of the Prior Art

Referring to FIG. 1, which specifies a circuit port of a current micro memory card (Micro SD) a provided with eight contact pins al and a circuit port of a short memory card (Mini SD) b configured with eleven contact pins $b_1$, three more than the micro memory card (Micro SD), wherein the tenth and eleventh contact pins b1 of the short memory card (Mini SD) b are currently non-functioning but reserved for future use, and No. three and No. six contact pins b1 of the short memory card (Mini SD) b are configured with the same grounding function. Embodiments of prior art have only one pin grounding-connected or a thin conductor is laid out between these two pins that realizes a limited grounding area, which results in the thin conductor easily breaking off or mistakenly touching other pins, causing damage to the circuit and the memory structure. Moreover, prior art is unable to effectively avert unexpected signal surges, and thus unable to protect data stored within the memory. In addition, grounding effectiveness needs to be enhanced to isolate noise interference. Furthermore, data transmission speed is relatively unstable, and thus unable to improve reliability and frequency of data access. Hence, actual use of the prior art card adapter runs counter to user needs.

SUMMARY OF THE INVENTION

A primary objective of the present invention is to provide an improved card adapter structure that uses a structural assembly of an upper cover, a lower cover and a converter terminal set to enable a large grounding area configured at No. three and No. six contact pins of the converter terminal set to provide a relatively large and stable grounding area between the two contact pins, which avoids the breaking off or mistaken contact with other pins of the conventional thin conductor resulting in damage to the circuit and memory structure, and effectively prevents unexpected signal surges, protects data stored within the memory, moreover, provides the adapter structure with reinforced grounding effectiveness, and isolates noise interference. In addition, stable speed of data transmission output improves memory card data access and increases frequency of use, and the relatively large and stable grounding area between two contact pins conveniently facilitates design of the card adapter circuit and structure. Accordingly, provides reinforced grounding effectiveness, protects data stored within the memory, isolates noise interference, improves memory card data access and frequency of use and facilitates design of the card adapter circuit and structure, which increase practicability, convenience and safety of the entire configuration.

Another objective of the present invention is to provide the improved card adapter structure that enables converting a micro memory card of relatively small size into a short memory card of relatively larger size, thereby facilitating inserting into a digital product provided with a short memory card circuit port for further use thereof, achieving effectiveness of a card adapter, and substantially increasing practicability and convenience of the entire configuration.

Yet another objective of the present invention is to provide the improved card adapter structure with a configuration whereby each pin of the converter terminal set supersedes the contact pins of the conventional circuit board, thereby reducing quality control management problems resulting from multiple assembly and substantially saving on costs.

In order to achieve the aforementioned objectives, the improved card adapter structure of the present invention comprises an upper cover, a lower cover and a converter terminal set. The upper cover is designed to conform to short memory card specifications, wherein an insertion slot is defined at the rear of the upper cover corresponding to the shape of a micro memory card. The lower cover is configured to correspond to the upper cover, and a port is configured in a central portion of the lower cover to accommodate a micro memory card. The upper cover is correspondingly joined to the lower cover. The converter terminal set is configured with eleven pins, wherein an injection molded fixing mount fixedly covers each of the terminals of the converter terminal set, and eleven electrical contact pins extend outward towards a short memory card opening. No. three and No. six of the eleven contact pins are configured with a large grounding area, and eight contact pins extend outward towards the micro memory card port. Accordingly, the adapter structure enables converting a micro memory card into a short memory card of relatively larger size, thereby providing convenience of use and achieving effectiveness of reinforced grounding, protecting data stored within the memory, preventing noise interference, improving memory card data access and frequency of use and facilitating design of the card adapter circuit and structure, which increase practicability, convenience and safety of the entire configuration.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
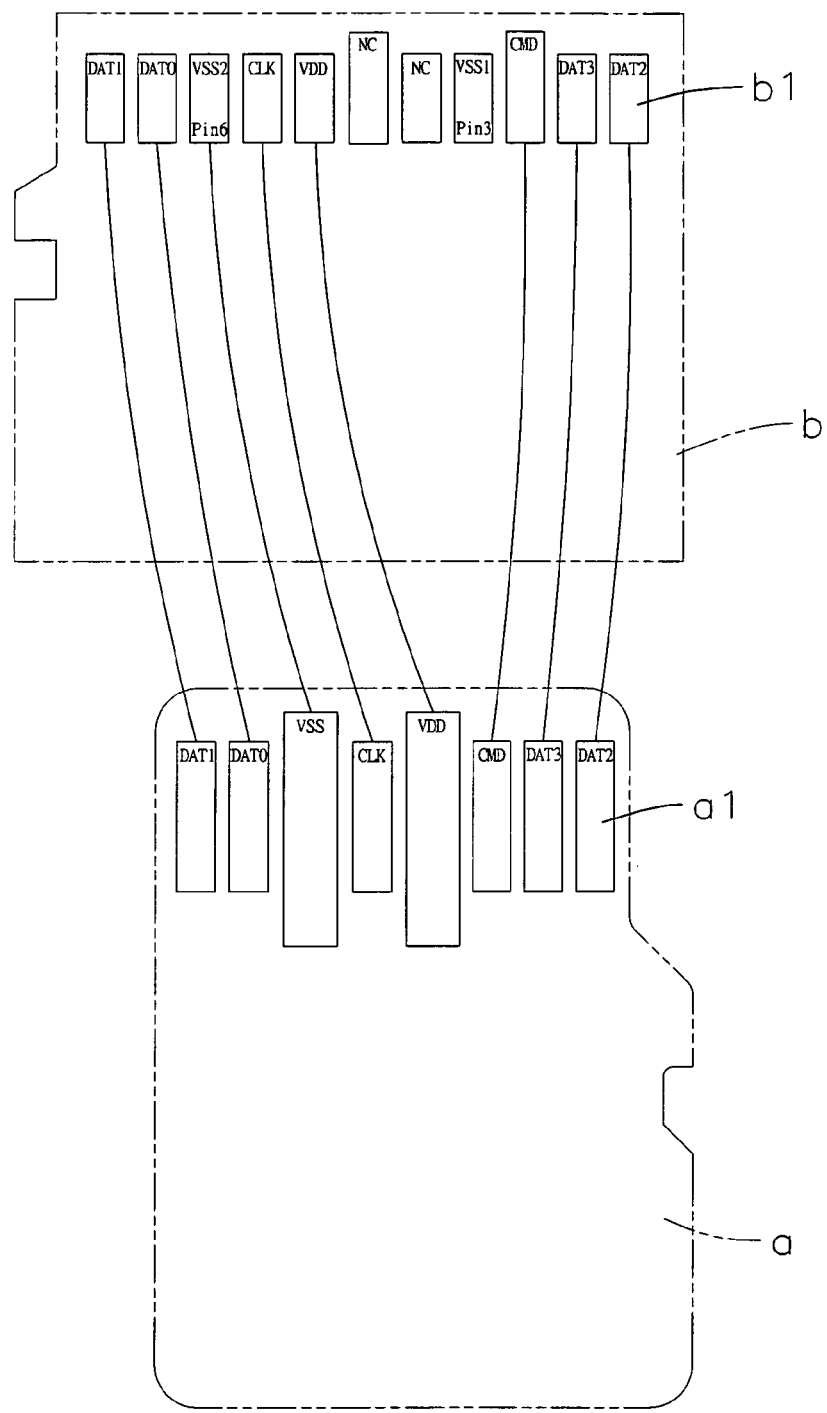
FIG. 1 shows a schematic view depicting electrical connections between a micro memory card (Micro SD) and a short memory card (Mini SD) of prior art.
Figure 2:
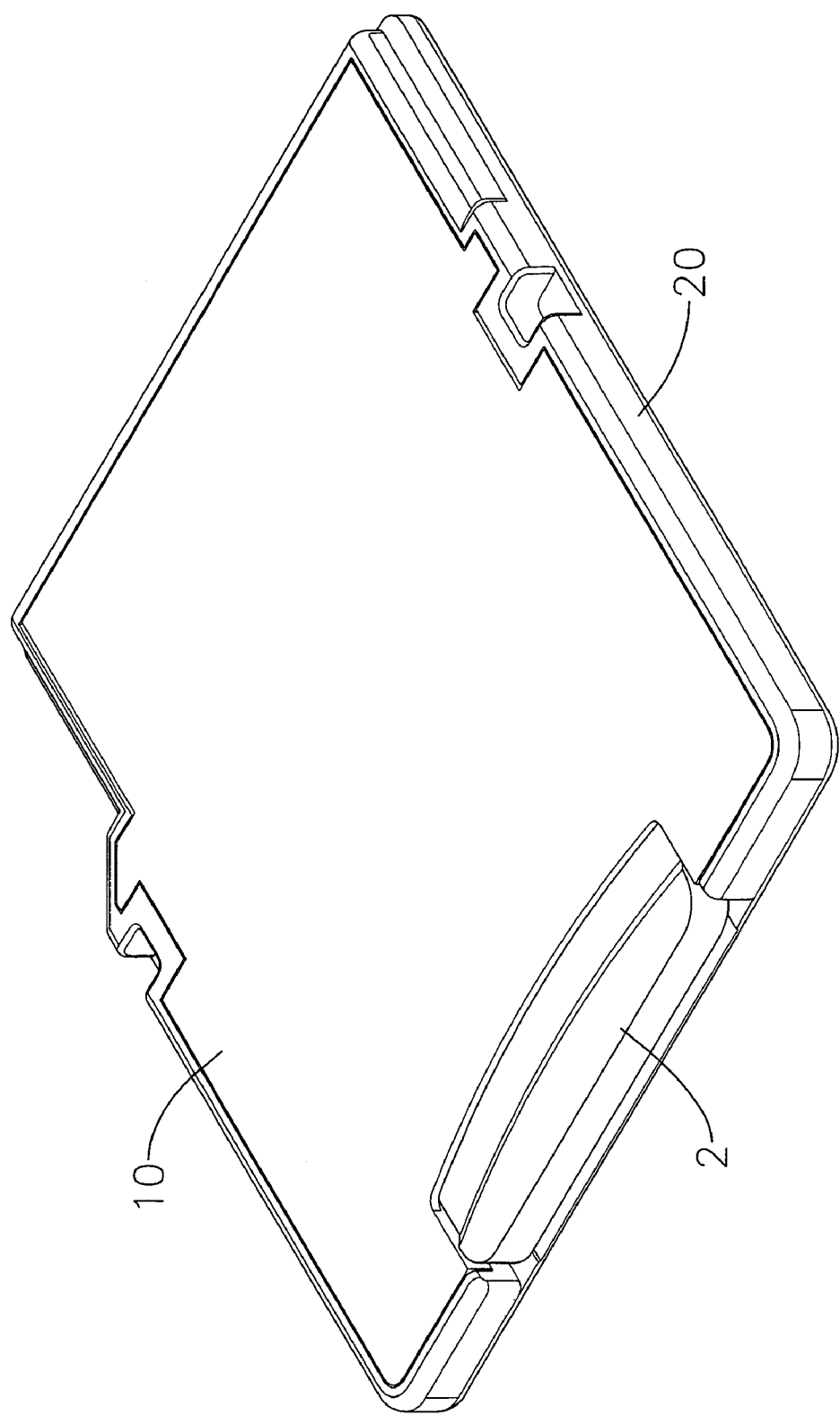
FIG. 2 shows an elevational view of an embodiment of the present invention.
Figure 3:
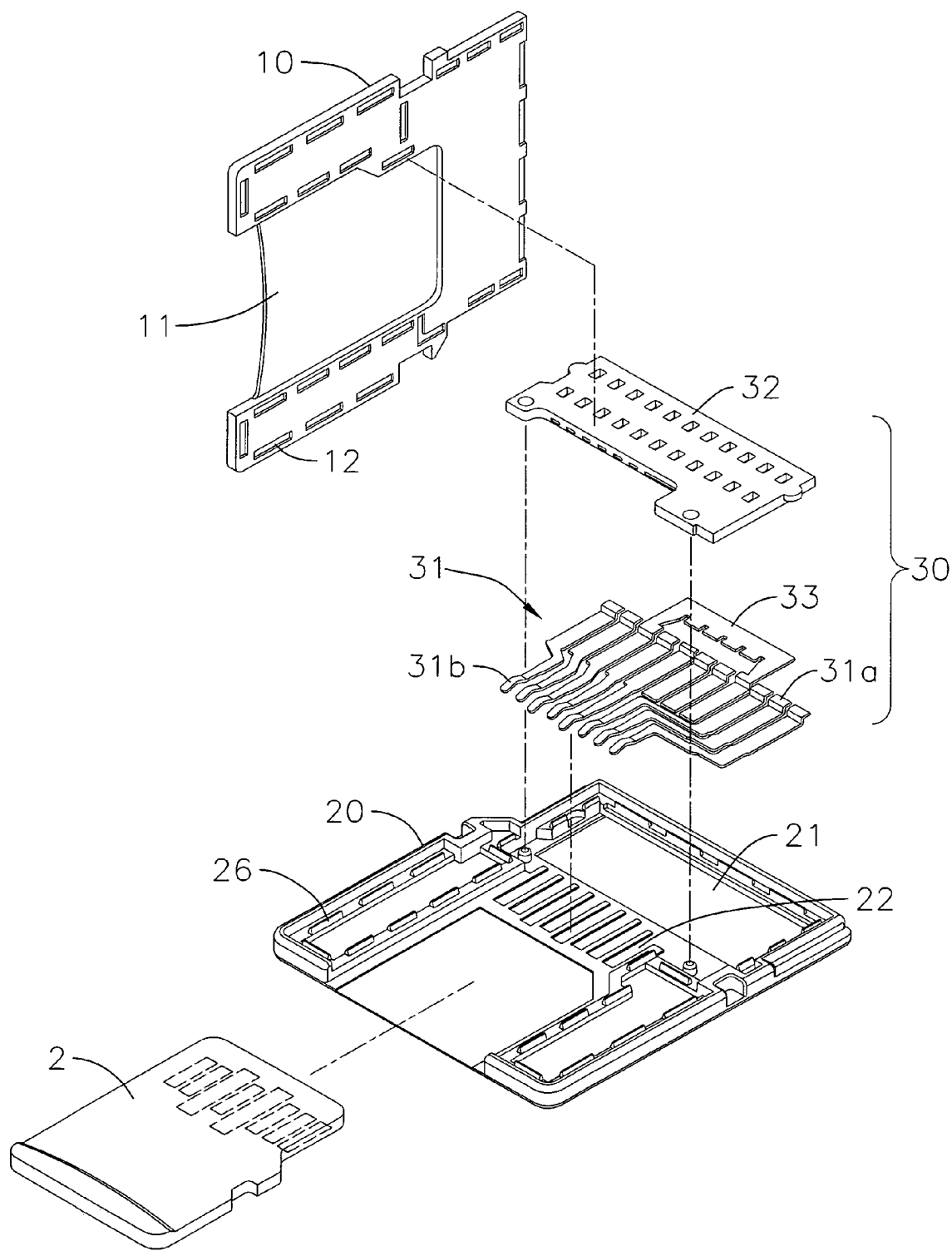
FIG. 3 shows an exploded elevational view of the embodiment depicting component members according to the present invention.
Figure 4:
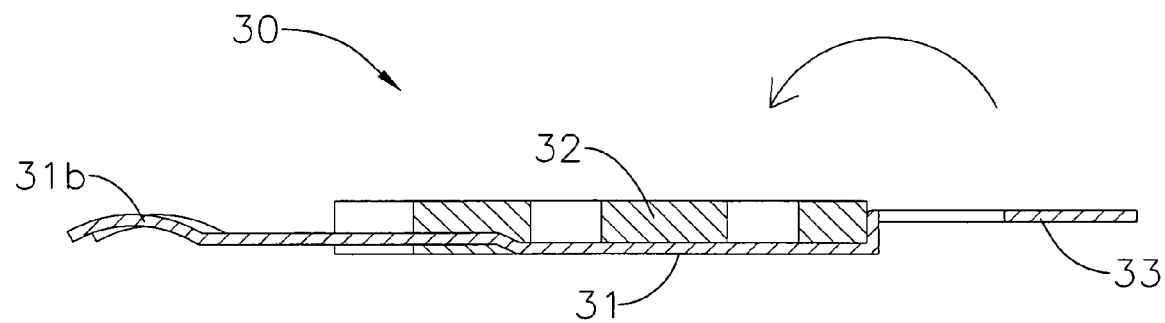
FIG. 4 shows a schematic view of the embodiment depicting joining of a converter terminal set according to the present invention.
Figure 5:
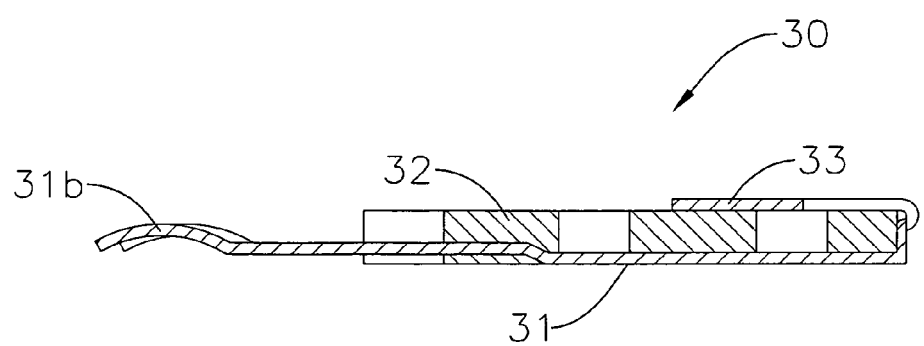
FIG. 5 shows a schematic view of the embodiment depicting a bent joint of the converter terminal set according to the present invention.
Figure 6:
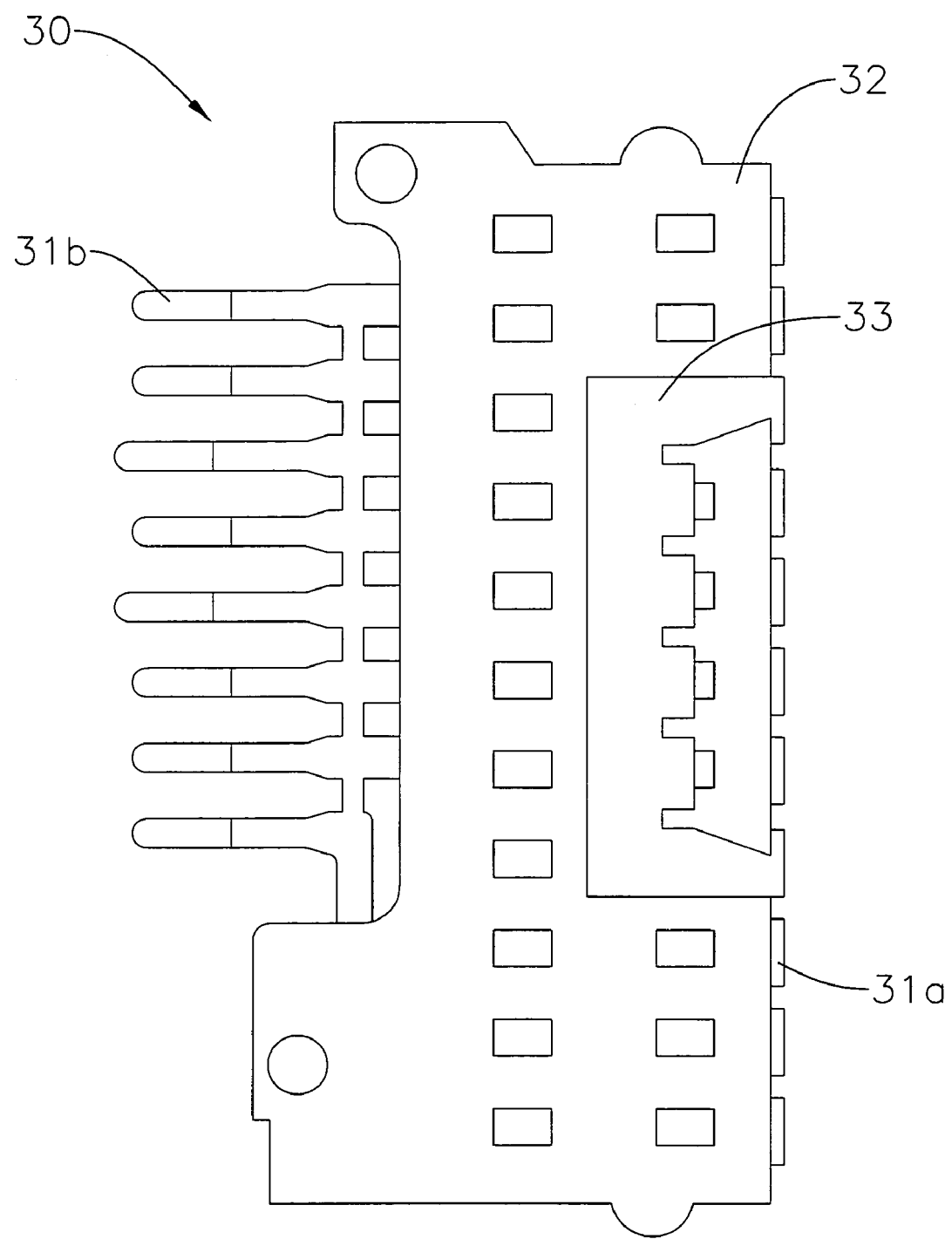
FIG. 6 shows a planar schematic view of the embodiment depicting joining of the converter terminal set according to the present invention.
Figure 7:
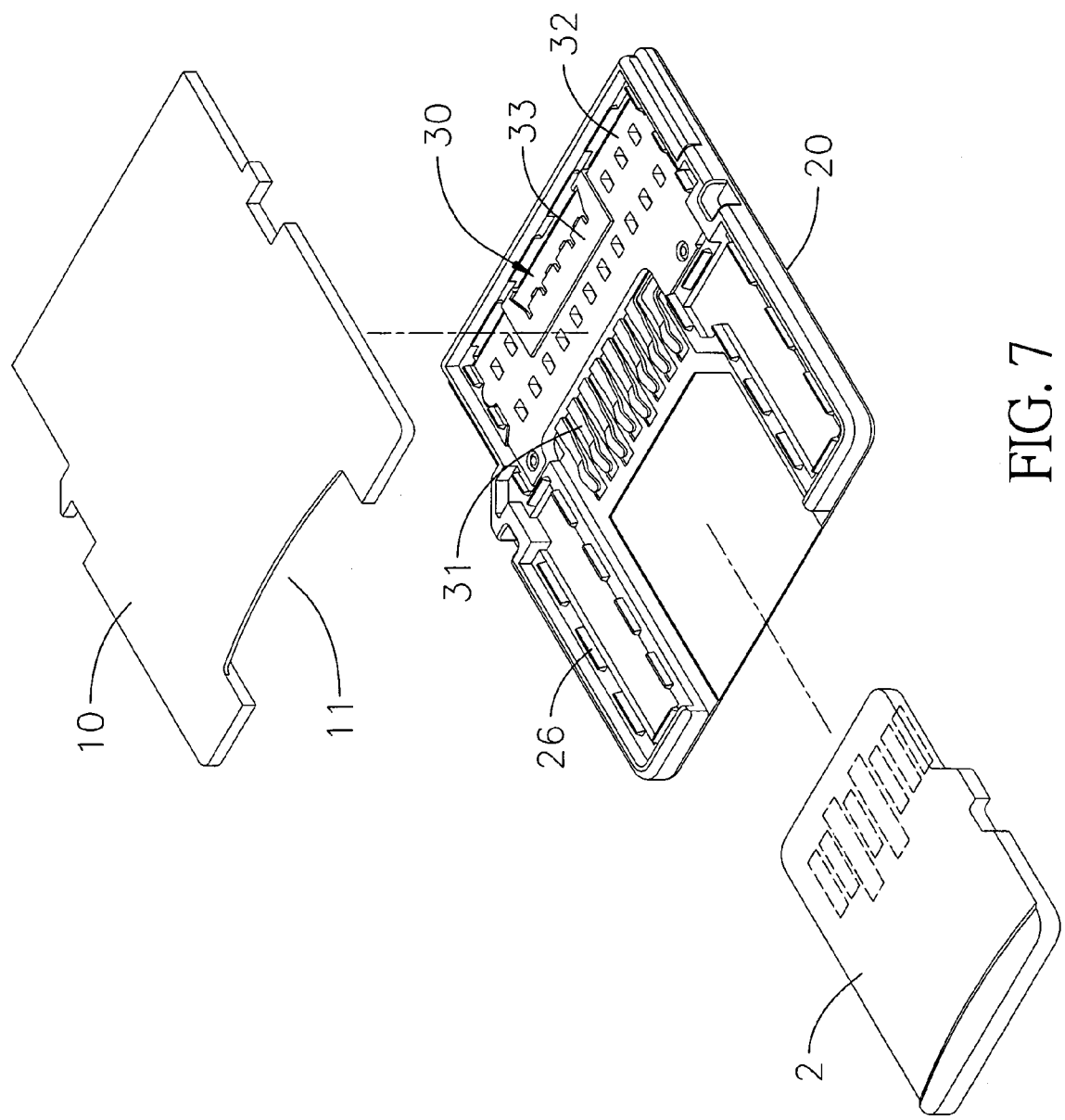
FIG. 7 shows a schematic view of the embodiment being combined with a micro memory card (Micro SD) according to the present invention.
Figure 8:
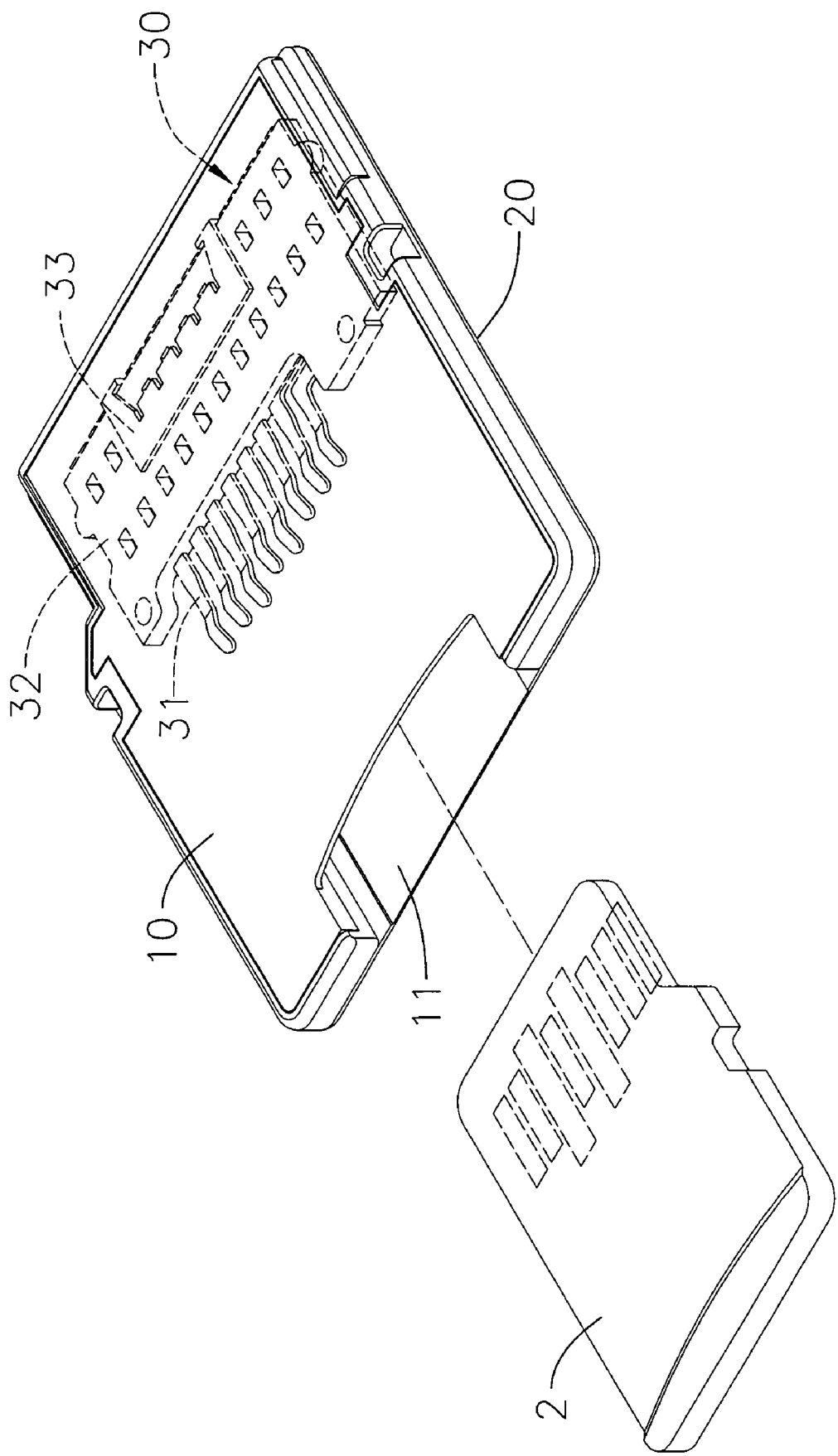
FIG. 8 shows a schematic view of the embodiment in use according to the present invention.

Referring to FIGS. 2~8, which show an improved card adapter structure of the present invention, comprising:

An upper cover 10 having a structure designed to conform to short memory card (Mini SD) specifications, wherein an insertion slot 11 is defined at a rear portion of the upper cover 10 corresponding to the shape of a micro memory card (Micro SD) 2, and a plurality of grooves 12 are defined on a bottom surface of the upper cover 10.

A lower cover 20 having a structure designed to conform to short memory card (Mini SD) specifications, wherein a short memory card (Mini SD) opening 21 is defined in a front portion of the lower cover 20, and a port 22 is configured in a central portion of the lower cover 20 to accommodate a micro memory card (Micro SD). A plurality of protruding pieces 26 are located on the lower cover 20 corresponding to the plurality of grooves 12 defined on the upper cover 10, thereby enabling the upper cover 10 to be joined to the lower cover 20 to form a solid structural configuration therewith. Moreover, the upper cover 10 covers and is disposed within the lower cover 20, thereby reducing thickness of the card adapter.

A converter terminal set 30 configured with eleven terminals 31, wherein an injection molded fixing mount 32 fixedly covers each of the terminals 31 of the converter terminal set 30, and eleven contact pins 31a extend outward towards the short memory card (Mini SD) opening 21. No. three and No. six pins of the eleven contact pins 31a are configured with a substantially large grounding area 33. An embodiment of the present invention adopts a bendable substantially large conducting strip (in actual use, method adopted can be a conventional layout of a printed circuit board, conducting coated material or conducting paint), and eight electrical contact points 31b extend outward towards the micro memory card (Micro SD) port 22.

According to the aforementioned structural configuration of the improved card adapter structure of the present invention, as depicted in FIGS. 2~8, the present invention is characterized in that structural assembly of the upper cover 10, the lower cover 20 and the converter terminal set 30 uses the substantially large grounding area 33 configured at No. three contact point and No. six contact point of the converter terminal set 30 to provide a substantially large and more stable grounding area between the two contact points, which avoids the shortcomings of prior art whereby the conventional thin conductor easily breaks off or mistakenly touches other contact points, resulting in damage to the circuit and memory structure. Hence, the present invention is able to effectively prevent unexpected signal surges and protect data stored within the memory. Moreover, the adapter structure of the present invention is provided with reinforced grounding effectiveness, and isolates noise interference. In addition, stable speed of data transmission improves memory card data access and increases frequency of use, and the relatively larger and stable grounding area between two contact points facilitates design of the card adapter circuit and structure. Accordingly, the present invention is provided with effectiveness of reinforced grounding, protecting data already stored within the memory, isolating noise interference, improving memory card data access and frequency of use and facilitating design of the card adapter circuit and structure, which increase practicability, convenience and safety of the entire configuration.

According to the aforementioned detailed description, persons familiar with related art are able to easily understand that the present invention can clearly achieve the aforementioned objectives, and evidently complies with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A card adapter structure, comprising:
    an upper cover having an external form designed to conform to short memory card (Mini SD) specifications, wherein an insertion slot is defined at the rear of the upper cover corresponding to the shape of a micro memory card (Micro SD);
    a lower cover having an external form designed to conform to short memory card (Mini SD) specifications, wherein a short memory card (Mini SD) opening is defined at the front of the lower cover, and a port is configured in a central portion of the lower cover to accommodate a micro memory card (Micro SD), the lower cover and the upper cover are correspondingly joined together; and
    a converter terminal set configured with eleven terminals, wherein an injection molded fixing mount fixedly covers each of the terminals of the converter terminal set, and eleven contact pins extend outward towards the short memory card (Mini SD) opening, No. three and No. six pins of the eleven contact pins are configured with a substantially large grounding area, and eight contact pins extend outward towards the micro memory card (Micro SD) port.

2. The card adapter structure according to claim 1, wherein the upper cover covers and is disposed within the lower cover, thereby reducing thickness of the card adapter.

3. The card adapter structure according to claim 1, wherein a plurality of grooves are defined on a bottom surface of the upper cover, and a plurality of protruding pieces are located on the lower cover, thereby enabling the upper cover to be correspondingly joined to the lower cover and form a solid structural configuration.

4. The card adapter structure according to claim 1, wherein the converter terminal set further comprises a bendable substantially large conducting strip as the grounding area.

5. The card adapter structure according to claim 1, wherein the converter terminal set further comprises a conventional layout of a printed circuit board as the substantially large grounding area.

6. The card adapter structure according to claim 1, wherein the converter terminal set further comprises a conducting coated material as the substantially large grounding area.

7. The card adapter structure according to claim 1, wherein the converter terminal set further comprises a conducting paint as the substantially large grounding area.

* * * * *